United States Patent
Maltz (10) Patent No.: US 9,430,457 B2
(45) Date of Patent: Aug. 30, 2016

(54) AMBIGUITY REDUCTION FOR IMAGE ALIGNMENT APPLICATIONS

(71) Applicant: Xerox Corporation, Norwalk, CT (US)

(72) Inventor: Martin S. Maltz, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 14/582,321

(22) Filed: Dec. 24, 2014

(65) Prior Publication Data

US 2016/0188559 A1  Jun. 30, 2016

(51) Int. Cl.
*G06F 17/24* (2006.01)
*H04N 1/387* (2006.01)

(52) U.S. Cl.
CPC ......... *G06F 17/243* (2013.01); *G06F 17/248* (2013.01); *H04N 1/3873* (2013.01); *H04N 2201/0081* (2013.01)

(58) Field of Classification Search
USPC ....................................................... 358/1.15
See application file for complete search history.

(56) References Cited

U.S. PATENT DOCUMENTS

| | | | | |
|---|---|---|---|---|
| 4,792,226 A | * | 12/1988 | Fishbine | G07C 9/00158 356/71 |
| 4,803,734 A | * | 2/1989 | Onishi | G01N 21/956 382/115 |
| 5,040,223 A | * | 8/1991 | Kamiya | G07C 9/00087 382/127 |
| 5,613,013 A | * | 3/1997 | Schuette | G06K 9/32 356/400 |
| 5,812,252 A | * | 9/1998 | Bowker | F41A 17/066 250/227.11 |
| 5,909,501 A | * | 6/1999 | Thebaud | G06K 9/00067 382/124 |
| 7,397,938 B2 | | 7/2008 | Cathier | |
| 8,271,871 B2 | | 9/2012 | Marchesotti | |
| 8,285,074 B2 | | 10/2012 | Saund et al. | |
| 8,605,972 B2 | | 12/2013 | Yu et al. | |
| 8,681,387 B2 | | 3/2014 | Maltz et al. | |
| 8,699,821 B2 | | 4/2014 | Orr, IV et al. | |
| 2001/0016055 A1 | * | 8/2001 | Harkless | G06K 9/0008 382/115 |
| 2004/0236220 A1 | * | 11/2004 | Willis | A61B 8/0841 600/443 |
| 2012/0155777 A1 | | 6/2012 | Schweiger et al. | |
| 2014/0126839 A1 | | 5/2014 | Qin et al. | |

OTHER PUBLICATIONS

Tsai et al., "Fast Normalized Cross Correlation for Defect Detection", Machine Vision Lab, Department of Industrial Engineering and Management, Yuan-Ze University, Chung-Li, Taiwan, R.O.C., pp. 1-15, Dec. 2014.

Briechle et al., "Template Matching Using Fast Normalized Cross Correlation", Institute of Automatic Control Engineering, Technische Universitat Munchen, 80290 Munchen, Germany, pp. 1-8, Dec. 2014.

* cited by examiner

*Primary Examiner* — Ngon Nguyen
(74) *Attorney, Agent, or Firm* — Gibb & Riley, LLC (57) ABSTRACT

According to exemplary systems and methods, a template is partitioned into blocks using an image processor. An image is scanned using an optical scanner. The image is aligned to the template. Image features are matched with template features in the blocks of the template. Displacement vectors are identified for differences of the image features from the template features. Normalized cross correlation (NCC) is determined between blocks of the image and each block of the template using the image processor. Peaks in the NCC are identified. A displacement vector is selected for a peak with highest NCC for each the block of the template. Ambiguous template features are identified in the image based on the displacement vector. Blocks are iteratively combined and NCC determined to remove the ambiguous template features.

18 Claims, 9 Drawing Sheets

AMBIGUITY REDUCTION FOR IMAGE ALIGNMENT APPLICATIONS

BACKGROUND

Systems and methods herein generally relate to printing and scanning systems/methods and more particularly to reducing ambiguity in aligning images.

It is often useful to align a photo (from a scanner, mobile phone, camera, etc.) with a template, since that puts all the regions of interest on the photo in a known location. This usually involves finding features in the photo corresponding to features in the template. This gives a set of displacement vectors. A warping process is fit to the displacement vectors and used to warp the photo into alignment with the template. However quite often, there are many features in the photo that look like the corresponding feature in the template and it is not clear which one is the right one. Also, there may be features in the photo that are not in the template, for example, when comparing a filled-in form with the original template.

Aligning a filled in form with a template is a first step in extracting the information from the form. It is difficult to do this for a cell phone photo of a document lying on a desk since the document generally does not lie flat and the optical axis of the cell phone is generally not perpendicular to the document. Therefore there is a need for a process that can quickly align a photo with a template with high accuracy.

SUMMARY

According to exemplary methods herein, a template is partitioned into blocks using an image processor. An image is scanned using an optical scanner. The image is aligned to the template. Image features are matched with template features in the blocks of the template. Displacement vectors are identified for differences of the image features from the template features. Normalized cross correlation (NCC) is determined between blocks of the image and each block of the template using the image processor. Peaks in the NCC are identified. A displacement vector is selected for a peak with highest NCC for each the block of the template. Ambiguous template features are identified in the image based on the displacement vector. Blocks are iteratively combined and NCC determined to remove the ambiguous template features.

According to exemplary methods herein, a template is received into an image processor. Electronic instructions are provided to the image processor to cause the image processor to partition the template into blocks. A scan of an image is received into the image processor. Electronic instructions are provided to the image processor to cause the image processor to align the scan of the image to the template. Electronic instructions are provided to the image processor to cause the image processor to match image features with template features in the blocks of the template. Electronic instructions are provided to the image processor to cause the image processor to identify displacement vectors for differences of the image features from the template features. Electronic instructions are provided to the image processor to cause the image processor to determine normalized cross correlation (NCC) between blocks of the image and each block of the template. Electronic instructions are provided to the image processor to cause the image processor to identify peaks in the NCC. Electronic instructions are provided to the image processor to cause the image processor to select a displacement vector for a peak with highest NCC for each the block of the template. Electronic instructions are provided to the image processor to cause the image processor to identify ambiguous template features in the image based on the displacement vector. Electronic instructions are provided to the image processor to cause the image processor to iteratively combine blocks and determine NCC to remove the ambiguous template features.

According to exemplary systems, an optical scanner is operatively connected to an image processor. The image processor receives a template and partitions the template into blocks. The optical scanner scans an image to produce a scan. The image processor aligns the scan to the template. The image processor matches features of the scan with features of the template in the blocks of the template. The image processor identifies displacement vectors for differences of the features of the scan from the features of the template. The image processor determines normalized cross correlation (NCC) between blocks of the scan and each block of the template. The image processor identifies peaks in the NCC. The image processor selects a displacement vector for a peak with highest NCC for each the block of the template. The image processor identifies ambiguous template features in the scan based on the displacement vector. The image processor iteratively combines blocks and determines NCC to remove the ambiguous template features.

According to a computer system for automatically reducing ambiguity in image alignment applications, the computer system comprises a program product comprising a tangible computer readable storage medium having program code embodied therewith. The program code is readable and executable by a computer to provide an application to perform a method. According to the method, a template is partitioned into blocks using an image processor. An image is scanned using an optical scanner. The image is aligned to the template. Image features are matched with template features in the blocks of the template. Displacement vectors are identified for differences of the image features from the template features. Normalized cross correlation (NCC) is determined between blocks of the image and each block of the template using the image processor. Peaks are identified in the NCC. A displacement vector is selected for a peak with highest NCC for each the block of the template. Ambiguous template features are identified in the image based on the displacement vector. Blocks are iteratively combined and NCC determined to remove the ambiguous template features.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

Figure 1:
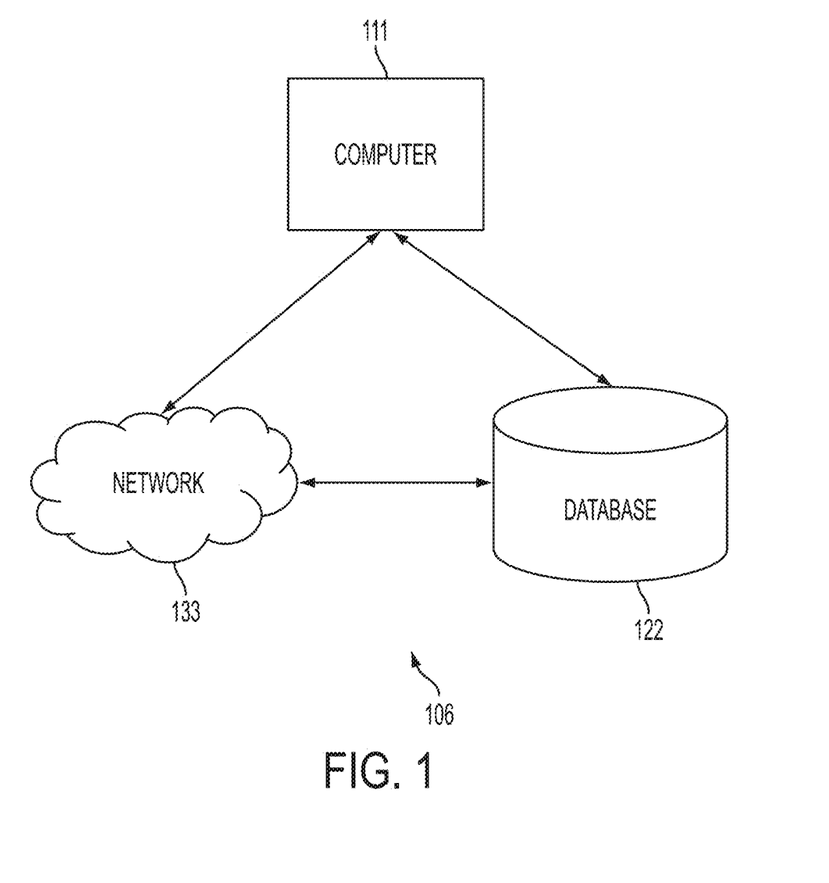
FIG. 1 is a block diagram of a network according to systems and methods herein.

Referring now to the drawings, FIG. 1 is a general overview block diagram of a network, indicated generally as 106, for communication between a computer 111 and a database 122. The computer 111 may comprise any form of processor as described in further detail below. The computer 111 can be programmed with appropriate application software to implement the methods described herein. Alternatively, the computer 111 is a special purpose machine that is specialized for processing image data and includes a dedicated processor that would not operate like a general purpose processor because the dedicated processor has application specific integrated circuits (ASICs) that are specialized for the handling of image processing operations, processing image data, comparing acquired image data to stored templates, etc. In one example, the computer 111 is special purpose machine that includes a specialized video card having unique ASICs for providing clear image processing, includes specialized boards having unique ASICs for input and output devices to speed network communications processing, a specialized ASIC processor that performs the logic of the methods described herein (such as the processing shown in FIG. 4) using dedicated unique hardware logic circuits, etc.

Database 122 includes any database or any set of records or data that the computer 111 desires to retrieve. Database 122 may be any organized collection of data operating with any type of database management system. The database 122 may contain matrices of datasets comprising multi-relational data elements.

The database 122 may communicate with the computer 111 directly. Alternatively, the database 122 may communicate with the computer 111 over network 133. The network 133 comprises a communication network either internal or external, for affecting communication between the computer 111 and the database 122. For example, network 133 may comprise a local area network (LAN) or a global computer network, such as the Internet.

Disclosed herein are methods and systems to align an image of a template/form with a photo/scan of a document corresponding to a filled-in version of the template/form having user markings. That is, the template may comprise a user-fillable pre-printed form. The pre-printed form may include patterned lines (e.g., pixel patterns, geometric patterns, etc.). The method operates by finding a warping process that warps the image into alignment with the template. In order to fit the warping process, correspondences between portions of the image and the template are found by maximizing a similarity metric and displacement vectors describing the correspondences are computed. Since ambiguities can arise (e.g., because multiple portions of the image may be similar to a single portion in the template, and vice-versa), the approach filters ambiguous correspondences via a region-growing-like process where ambiguous displacement vectors that are incoherent with neighboring unambiguous displacement vectors are discarded. The process is repeated iteratively until the ambiguities are removed.

The general approach for solving an image alignment problem is to assume a reasonable model and apply it to the device values to obtain a master image. The scanned image is split up into blocks, and the zero mean normalized cross correlation is determined between each block and the corresponding area of the master image. The scanned image block is displaced using a number of different displacement vectors, and the cross correlation is determined for each displacement. A warping process for determining the displacement vector for each master image pixel is then fit to the displacement vectors determined for all of the blocks. This process is then used to find the pixel in the scanned image that corresponds to each pixel in the master image. This information is used to build an image that is exactly the same size as the master image, but where each pixel has the color of the corresponding pixel in the scanned image. The exemplary processes are described herein with reference to black and white images, which makes the process quicker. However, it is contemplated that the approach can be used for color images as well.

As would be understood by one of ordinary skill in the art, a "pixel" refers to the smallest segment into which an image can be divided. Received pixels of an input image are associated with a value defined in terms of intensity, lightness, brightness, or some mathematical transformation thereof.

According to systems and methods herein, for each feature in the template, a list of displacements is created to all candidate features in the image with a similarity metric above a predetermined threshold. For some template features the match will be ambiguous; that is, there may be many possible matches. For some template features, the match will be unambiguous; that is, only one possible match. For all the ambiguous template features adjacent to unambiguous features, if a reasonable warping function of one of the candidate displacement vectors in the ambiguous template feature reveals a displacement vector in the vicinity of the displacement vector in the adjacent unambiguous template feature or features, the displacement vector is selected, and the ambiguous template feature becomes unambiguous. If there is no such displacement vector, the ambiguous template feature is ignored. An iterative region growing process is used to remove the ambiguity from as many template features as possible.

In order to identify the ambiguities, the template is split into a rectangular array of blocks. The normalized cross correlation (NCC) is calculated between the test image and a displaced version of the template block. This calculation is done for a limited range of displacements, and the peaks in the NCC are found. The displacement vector for the peak with the highest NCC is recorded in the block structure. If the difference in NCC between all the remaining peaks and the peak with highest NCC is greater than a predetermined threshold, the block has an unambiguous displacement vector. If the difference is less than the threshold, the additional displacement vectors are added to the block structure, and the block is ambiguous. The region growing process is then used to remove the ambiguity from as many of the blocks as possible.

Figure 2:
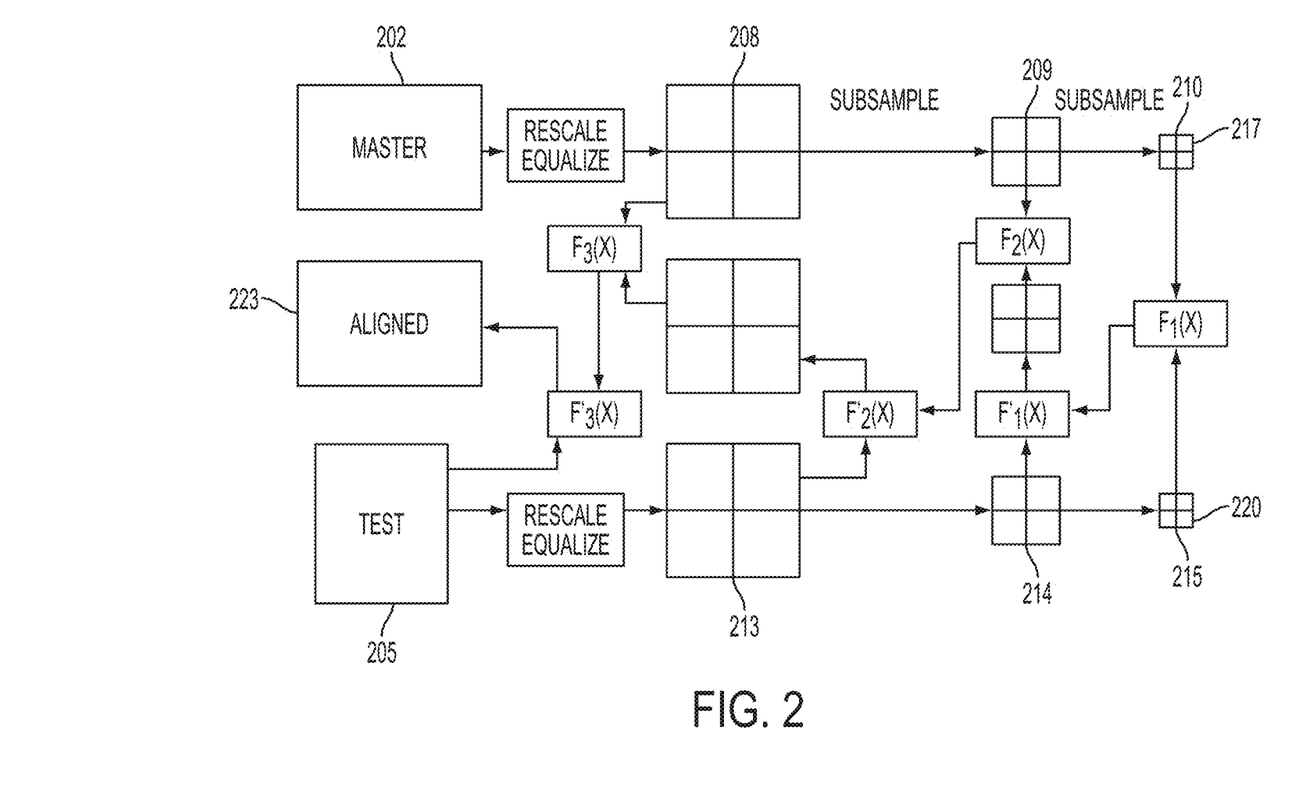
FIG. 2 illustrates an exemplary process flow according to systems and methods herein.

FIG. 2 illustrates an exemplary process flow to align images, according to systems and methods herein. A multi-resolution alignment technique is used to do this quickly and accurately. Since the dynamic range of the master image 202 and test image 205 can be very different, histogram equalization is first applied. Histogram equalization is a technique for adjusting image intensities in order to enhance contrast in the image. As would be known to one ordinarily skilled in the art, flattening the histogram of both the master image 202 and the test image 205 makes them look more alike.

The master image 202 is then subsampled into a series of images of decreasing resolution, as indicated at 208, 209, 210 and the test image 205 is subsampled into a series of images of decreasing resolution, as indicated at 213, 214, 215. The lowest resolution master image 210 is split into a set of blocks 217, and the displacement, S, of each block of the set of blocks 217 is found that maximizes the normalized cross correlation (NCC) between this block and corresponding blocks 220 of the test image.

A warping process (S=F(Xm)) is then fit to this data, where Xm is the position in the master image. The warping process is then scaled to the resolution of the next larger subsampled image (209, 214, respectively), and used to roughly align the higher resolution test image with the master. The process is repeated as the module works its way up to aligning the highest resolution images (208, 213, respectively).

Normalized correlation is one of the methods used for template matching, a process used for finding incidences of a pattern or object within an image. This is typically done at every step by subtracting the mean and dividing by the standard deviation. That is, the cross-correlation of a template, t(x,y) with a subimage f(x,y) is $$\frac{1}{n}\sum_{x,y}\frac{(f(x,y)-\bar{f})(t(x,y)-\bar{t})}{\sigma_f \sigma_t} = \frac{\frac{1}{n}\sum_{x,y} f(x,y)t(x,y) - \bar{f}\bar{t}}{\sigma_f \sigma_t},$$

where n is the number of pixels in t(x,y) and f(x,y), $\bar{f}$ is the average of f and $\sigma_f$ is standard deviation of f. In functional analysis terms, this can be thought of as the dot product of two normalized vectors. That is, if $$F(x,y)=f(x,y)-\bar{f} \text{ and } T(x,y)=t(x,y)-\bar{t},$$

then the above sum is equal to $$\left\langle \frac{F}{\|F\|}, \frac{T}{\|T\|} \right\rangle$$

where $\langle \bullet; \bullet \rangle$ is the inner product and $\|\bullet\|$ is the $L^2$ norm. Thus, if f and t are real matrices, their normalized cross-correlation equals the cosine of the angle between the unit vectors F and T, being thus 1 if and only if F equals T multiplied by a positive scalar.

Figure 3:
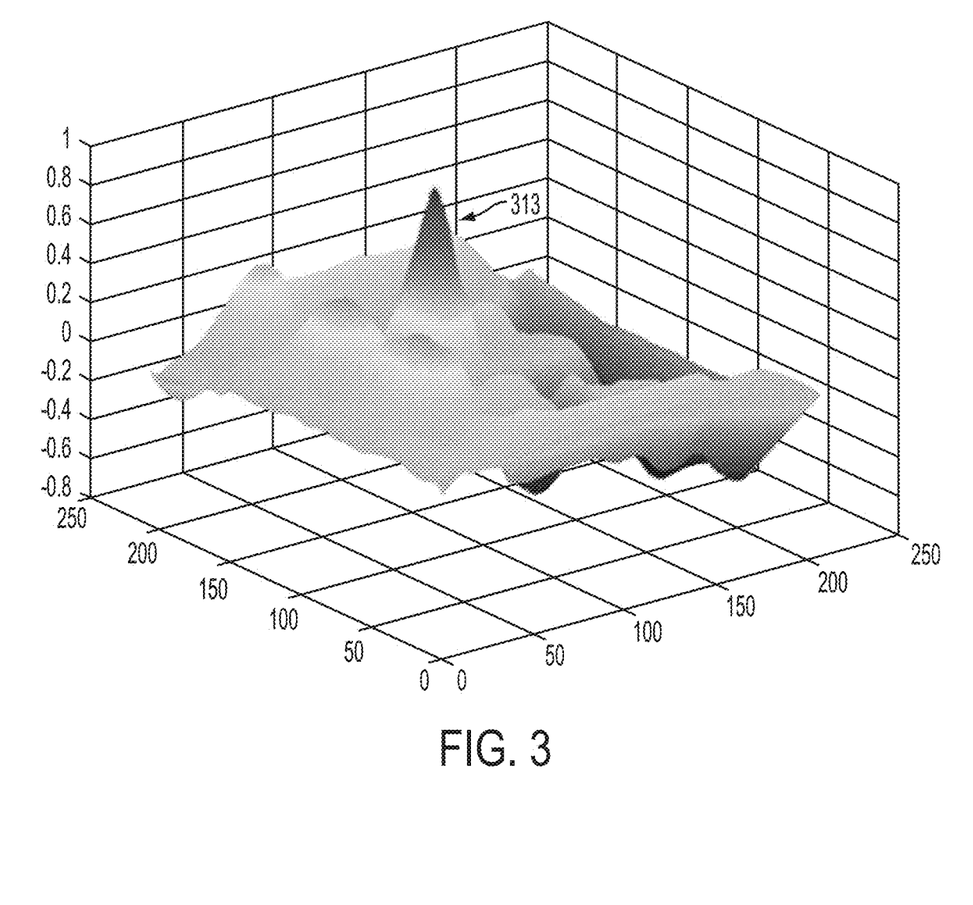
FIG. 3 is a perspective view of exemplary normalized cross correlation of images according to systems and methods herein.

FIG. 3 is a perspective view of a surface plot resulting from a normalized cross-correlation. The peak 313 of the cross-correlation matrix occurs where the subimages are best correlated.

Figure 4:
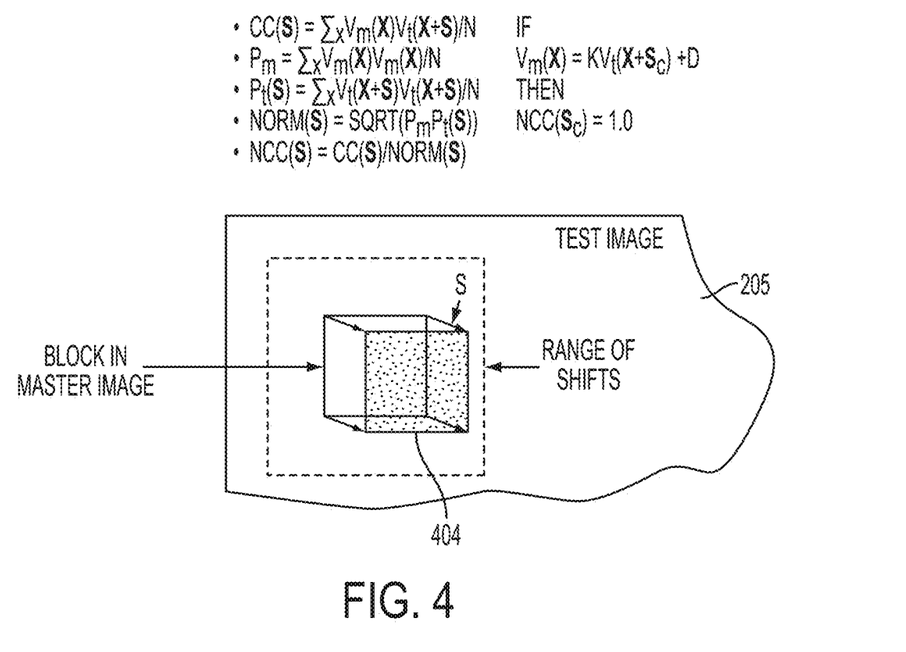
FIG. 4 illustrates an exemplary process for normalized cross correlation of images according to systems and methods herein.

Referring to FIG. 4, in order to find the peak in the NCC a block 404 in the master image is shifted over a specified range, and the NCC is determined for each shift. CC(S) is the un-normalized cross correlation, Vt(X) and Vm(X) are the brightness of the test image 205 and the master image 202 at point X, and N is the number of pixels in the region. Norm is the normalization factor, which is the square root of the product of Pm and Pt(S), the signal power in the master and test regions of interest. If there is a displacement, Sc, where the brightness of one image is just a linear process of the brightness in the other, the NCC=1.

According to systems and methods herein, the test image 205 undergoes two processes. One process warps the sub-sampled versions of the test image (213, 214, and 215) to match the corresponding subsampled version of the master image (208, 209, 210). The warp is described by warping functions, $F_x(x,y)$ and $F_y(x,y)$, where X, Y is the position in the original image, x,y is the corresponding position in the warped image, $X=x+F_x(x,y)$, and $Y=y+F_y(x,y)$. The warped image is the same size as the original image. The color at each position, x,y, in the warped image is found by calculating the corresponding X, Y, and interpolating between the nearby colors in the original image.

The methods herein also finds the warping functions that best align the test image 205 with the master image 202, and then uses the warping functions to warp the test image 205 to produce an aligned image 223 (FIG. 2). In this case the aligned image 223 is the same size as the master image 202. The warping functions are defined as described above, and x,y is a position in the master image 202 or the aligned image 223, and X, Y is the corresponding position in the test image 205.

As described above, the warping functions are found by splitting the master image 202 and test image 205 into blocks 217, 220, and finding the displacement of each block 220 of the test image that best aligns it (maximizes the correlation process) with the corresponding block 217 of the master image. The warping functions are defined as a sum of polynomials in x and y. The polynomial weighting factors are chosen to maximize the total correlation between the aligned image 223 and the master image 202.

The method herein uses a set of orthonormal polynomials. The orthonormal polynomials are:

$$f_0(m,u)=1$$

$$f_1(m,u)=\text{sqrt}(12)*m$$

$$f_2(m,u)=\text{sqrt}(12)*u$$

$$f_3(m,u)=\text{sqrt}(5)*(6*m*m-0.5)$$

$$f_4(m,u)=\text{sqrt}(5)*(6*u*u-0.5)$$

$$f_5(m,u)=12*m*u.$$

These polynomials are orthonormal over the range $-0.5<m,u<0.5$, and can handle rotation, translation, shear, bow, and keystone distortions. To handle pincushion and barrel distortions third order terms are needed. The third order orthogonal polynomials would be:

$$f_6(m,u)=k_6*m*(1-m*m*20/3)$$

$$f_7(m,u)=k_7*u*(1-12*m*m)$$

$$f_8(m,u)=k_8*m*(1-12*u*u)$$

$$f_9(m,u)=k_9*u*(1-u*u*20/3)$$

where $k_6$, $k_7$, $k_8$, and $k_9$ are the normalizing coefficients.

Finally, the warping processes can be written in terms of the orthonormal polynomials and the weighting factor vectors, A and B as:

$$X(x,y) = \Sigma_i A[i] * F_i(x,y)$$

$$Y(x,y) = \Sigma_i B[i] * F_i(x,y)$$

where $F_i(x,y)$, $f_i(x/nx-0.5, y/ny-0.5)$ and nx and ny are the number of pixels and scan lines in the image minus one (x goes from 0 to pixels−1 and y goes from 0 to scanLines−1). Given X and Y, the pixels in the warped image are determined using triangular interpolation.

Additionally, the methods herein fit the warping process to weighted displacement vectors. The weight is the second derivative of the un-normalized cross correlation process in the vicinity of the peak in the normalized cross correlation process. This approach combines the best features of normalized and un-normalized cross correlation processes. The normalized process does a better job of avoiding incorrect alignments, while the un-normalized process weights the displacement vectors by their contribution to the cross correlation process for the entire image.

As described above, the images are scaled so they are both square, and $2^n$*nblock*minSize pixels on a side. Then a series of sub-sampled images are created, each one half the length and height of the one before. The smallest image is nblock*minSize pixels on a side.

The smallest master and test images are split into nblock*nblock blocks, each minSize pixels on a side. The displacement for each pair of corresponding blocks is calculated to maximize the correlation between the images. The warping functions that best describe the displacement pattern are then found. The warping functions are then scaled up by a factor of two, and applied to the next larger sub-sampled test image, approximately aligning it with the master image.

This larger image is split into nblock*nblock blocks, each 2*minSize pixels on a side. The additional warping required to align these two images is found and added to the previous warping functions to get a more accurate result. This process is repeated until the warping functions for the largest sub-sampled images are determined. These warping functions are then scaled up to the size of the original master and test image, and used to create the aligned image from the test image.

In other words, the master and test images are re-sampled so they are $2^n$*nblock*minSize on a side. n is chosen to make the difference between $2^n$*nblock*minSize and the largest dimension of the original master and test images as small as possible. If, for example, nblock was 5 and minSize was 20 (the default values), the sizes of the re-sampled images would be 100×100, 200×200, 400×400, 800×800, etc. If the largest dimension of the test and master images were 600, the size of the largest re-sampled test and master images would be 400×400. If the largest dimension were 601, the largest re-sampled images would be 800×800. The smaller re-sampled images are then made from the largest ones.

The un-normalized correlation between a block in the master image and the corresponding block in the test image displaced by an amount dx,dy is calculated using the formula:

$$\text{corr}(I_m, I_t(dx,dy)) = \Sigma_{x1}^{x2} \Sigma_{y1}^{y2} ((R_m(x,y) - <R_m(x,y)>) * (R_t(x+dx, y+dy) - <R_t(x+dx, y+dy)>) + (G_m(x,y) - <G_m(x,y)>) * (G_t(x+dx, y+dy) - <G_t(x+dx, y+dy)>) + (B_m(x,y) - <B_m(x,y)>) * (B_t(x+dx, y+dy) - <B_t(x+dx, y+dy)>))$$

where x goes from pixel x1 to pixel x2, and y goes from pixel y1 to pixel y2, $R_m G_m B_m$ is the color of a pixel at point x,y in the master image, $R_t G_t B_t$ is the color of point x+dx, y+dy in the test image, and $<R_m(x,y)>$, $<G_m(x,y)>$, $<B_m(x,y)>$, $<R_t(x+dx, y+dy)>$, $<G_t(x+dx, y+dy)>$, and $<B_t(x+dx, y+dy)>$ are the average values calculated over the range of pixels included in the calculation for the block. (Note: the correlation equation above includes analysis of color pixels however, it is applicable to black and white images, as well, which makes the process quicker.) Normally x1 is the left pixel of the block in the master image, x1 is the right, y1 is the top, and y2 is the bottom. Any pixel products that involve pixels that are not in either master or test image, however, are left out of the summation.

Another useful measure of alignment is the normalized correlation, ncorr, which is defined as $$\text{ncorr}(I_m, I_t(dx,dy)) = \text{corr}(I_m, I_m) / \text{sqrt}(\text{norm}(I_m) * \text{norm}(I_t(dx,dy)))$$

where the norm function is $$\text{norm}(I) = \Sigma_{x1}^{x2} \Sigma_{y1}^{y2} ((R(x,y) - <R(x,y)>) * (R(x,y) - <R(x,y)>) + (G(x,y) - <G(x,y)>) * (G(x,y) - <G(x,y)>) + (B(x,y) - <B(x,y)>) * (B(x,y) - <B(x,y)>)).$$

The normalized correlation always lies between the values +1.0 and −1.0, and attains the +1.0 value when the block in the master image, $I_m$, is related to the shifted block in the test image, It(dx,dy) by the equation $$I_m = P + Q * I_t(dx,dy)$$

where P and Q are constants. It is therefore a better measure of alignment than the un-normalized correlation. Blocks with larger values of un-normalized correlation, however, should have greater weight in the estimation of the warping function. Therefore, it is contemplated that both un-normalized and normalized correlations can be calculated.

The correlations are found for a range of displacements between dy=−D and dy=+D, and dx=−D and dx=+D. This calculation involves summing size*size*(2*D+1)*(2*D+1) vector dot products, where size is the size of the sub-sampled image, and is the most time consuming part of the alignment calculation. The calculation for the smallest sub-sampled image must be done over a wide range of displacements, but fortunately, size is small at this point. Since this calculation approximately aligns the test image with the master image, D can be smaller for the larger images, which shortens the processing time. The process therefore linearly decreases the value of D from range0 (default 15) to range1 (default 5) as the size goes from smallest to largest sub-sampled image. With the default range0 value, the process can align images warped by up to ±15%.

Next, the displacement, $dx_p$, $dy_p$ is found for where ncorr reaches its maximum, $\text{ncorr}_{max}$, and describes the normalized correlation function in the vicinity of the peak by the formula:

$$\text{ncorr}(x,y) = \text{ncorr}_{max} - \underline{XXn} * (dx - dx_p) * (dx - dx_p) - \underline{YYn} * (dy - dy_p) * (dy - dy_p) - \underline{XYn} * (dx - dx_p) * (dy - dy_p).$$

It can be shown that good estimates for $\underline{XXn}$, $\underline{YYn}$, and $\underline{XYn}$ are:

$$\underline{XXn} = \text{ncorr}_{max} - (\text{ncorr}(dx_p+1, dy_p) + \text{ncorr}(dx_p-1, dy_p))/2$$

$$\underline{YYn} = \text{ncorr}_{max} - (\text{ncorr}(dx_p, dy_p+1) + \text{ncorr}(dx_p, dy_p-1))/2$$

$$\underline{XYn} = (\text{ncorr}(dx_p-1, dy_p+1) + \text{ncorr}(dx_p+1, dy_p-1) - \text{ncorr}(dx_p+1, dy_p+1) - \text{ncorr}(dx_p-1, dy_p-1))/4.$$

Note, that if $dx_p$ or $dy_p$ are at the limits of their range (±D), the true peak correlation point might lie beyond the range investigated. In that case, the displacement data from the block is not used in calculating the warping functions.

Warping functions are chosen that maximize the total un-normalized correlation:

$$\text{corrTotal} = \Sigma_i(\text{corr}_{max}(i) - \underline{XX}^*(X_i - dx_i)^*(X_i - dx_i) - \underline{YY}^*(Y_i - dy_i)^*(Y_i - dy_i) - \underline{XY}^*(X_i - dx_i)^*(Y_i - dy_i))$$

where i is the block index going from 0 to nblock*nblock−1, $dx_i$ and $dy_i$ are the displacements determined for that block, $$\underline{XX} = \underline{XXn}^* \text{corr}(dx_p, dy_p)/\text{ncorr}(dx_p, dy_p)$$

$$\underline{XY} = \underline{XYn}^* \text{corr}(dx_p, dy_p)/\text{ncorr}(dx_p, dy_p)$$

$$\underline{YY} = \underline{YYn}^* \text{corr}(dx_p, dy_p)/\text{ncorr}(dx_p, dy_p)$$

and X, and Y, are the warping functions:

$$X_i = \Sigma_j A[j]^* F_j(x_i, y_i)$$

$$Y_i = \Sigma_j B[j]^* F_j(x_i, y_i)$$

evaluated at $x_i$, $y_i$, the center of block i.

To find the weighting coefficients, A[j] and B[j], that maximize the total correlation, use the partial derivatives of corrTotal with respect to A[j] and B[j], and set them equal to zero.

$$\begin{bmatrix} V_A \\ V_B \end{bmatrix} = \begin{bmatrix} H_{AA} & H_{AB} \\ H_{BA} & H_{BB} \end{bmatrix} \begin{bmatrix} A \\ B \end{bmatrix}$$

This gives rise to the matrix equation for A and B where $$V_A[j] = \Sigma_i((2^*\underline{XX}_j^* dx_i + \underline{XY}_i^* dy_i)^* F_j(x_i, y_i))$$

$$V_B[j] = \Sigma_i((2^*\underline{YY}_i^* dy_i + \underline{XY}_i^* dx_i)^* F_j(x_i, y_i))$$

$$H_{AA}[j][k] = \Sigma_i(2^*\underline{XX}_j^* F_j(x_i, y_i)^* F_k(x_i, y_i))$$

$$H_{AB}[j][k] = H_{BA}[k][j] = \Sigma_i(\underline{XY}_j^* F_j(x_i, y_i))^* F_k(x_i, y_i))$$

$$H_{BB}[j][k] = \Sigma_i(2^*\underline{YY}_i^* F_j(x_i, y_i)^* F_k(x_i, y_i)).$$

Because orthonormal polynomials defined over the range of the image are used, the H matrix is strongly diagonal, and the matrix equation can be easily solved for A and B. If, however, ordinary polynomials like x, y, x*x, y*y, x*y, etc., defined over the range 0 to nx and ny, where nx and ny are the number of pixels and scan lines in the image minus one are used, the H matrix would become nearly singular, and the matrix equation would become very hard to solve. For this reason, orthonormal polynomials are used.

The process that makes the test image may distort the geometry. In blocks where there are several peaks in the normalized cross correlation, these distortions can make the peak corresponding to the correct displacement smaller than some of the others. An incorrect displacement may be selected. The process herein therefore uses three techniques to avoid making this mistake.

First, histogram equalization is applied to reduce the discrepancies between the test image 205 and master image 202. Second, a check for outlier displacements is made. If there are any, the outliers are eliminated from the warping function calculation, and the calculation is re-performed. This process is iterated until no more outliers are found. Outliers are found by taking the ratio of the error for each displacement (the difference between the displacement found from the normalized cross correlation calculation, and the displacement calculated using the warping function) to the RMS error for the entire set of displacements. If it exceeds a threshold (e.g., 1.7 for the ratio), the displacement is an outlier. Finally, the previously discussed ambiguity reduction process can be applied.

After A and B are found, they are multiplied by two and used to align the next larger sub-sampled test image, which is twice as large. New A' and B' vectors are then found that best align this approximately aligned test image with the sub-sampled master image of the same size. These new A' and B' vectors are then added to the original A and B vectors to produced a refined estimate of A and B. This process is then iterated until the largest sub-sampled test image is aligned.

Finally, the vectors $A_f$ and $B_f$, for the warping functions that align the test image 205 with the master image 202 are found. It can easily be shown that:

$$A_f[0] = (tx - mx)/2 + (tx/N)^* A[0]$$

$$A_f[1] = (tx - mx)/\text{sqrt}(12) + (tx/N)^* A[1]$$

$$B_f[0] = (ty - my)/2 + (ty/N)^* B[0]$$

$$B_f[2] = (ty - my)/\text{sqrt}(12) + (ty/N)^* B[2]$$

where tx and mx are the number of pixels minus one for the original test image 205 and master image 202, ty and my are the corresponding quantities for the scan lines, and N is the size of the largest sub-sampled image minus one. For all the rest of the weighting factors:

$$A_f[i] = (tx/N)^* A[i]$$

$$B_f[i] = (ty/N)^* B[i]$$

These weighting factors for the polynomial function are then used to generate the aligned image 223 from the test image 205.

According to systems and methods herein, the process begins by aligning a low resolution image with a quadratic warping function. The quadratic warping function may be used at the lowest resolution to get the images roughly aligned. The rough alignment cannot typically handle the waviness that comes from a filled-in document that does not lie flat. Following the rough alignment, a 2D spline warping function may be used at higher resolution to fit the displacement vectors to a 2D spline. The 2D spline is fit to the weighted displacement vectors using techniques that should be well known to those skilled in the art.

In the present implementation the master image 202 may comprise a template and the test image 205 may comprise a digital photograph or scanned image. In this case the displacements may be large (e.g., 10% of the image size) and can be wavy. In the case of a scanned document, extra annotations may have been added to the test image 205. The alignment method described herein performs annotation lifting, where the test image 205 is aligned with the master image 202 to within a line width, so the master image 202 can be simply subtracted off of the test image 205, leaving the annotations. That is, in processing the test image 205, the features or the master image 202 may simply be removed. Furthermore the method herein must often handle forms or templates with grids of lines defining the spaces to be filled in. Such forms may contain large numbers of closely spaced identical features such as the intersection lines of the grid. For such forms, ambiguity is a very serious problem.

Figure 5:
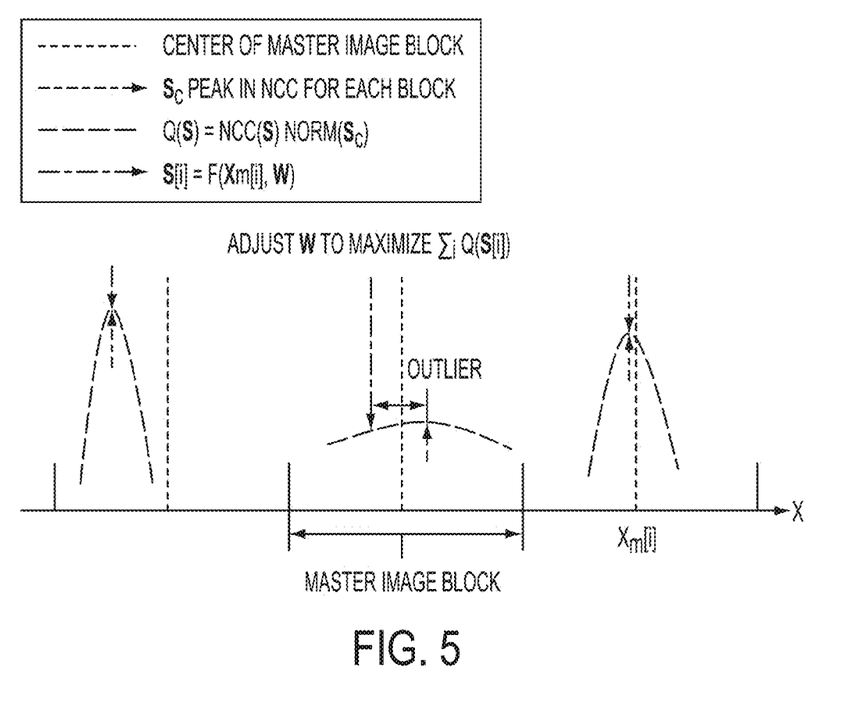
FIG. 5 illustrates an exemplary alignment process according to systems and methods herein.

As described above, the master image 202 is split into blocks and the blocks are scanned over the test image 205 to find peaks 313 in the NCC. Referring to FIG. 5, a global quadratic warping process, F(Xm,W), where W contains the process parameters, is fit to the displacement vectors by maximizing a total cross correlation process. Q(S) is the contribution of a single block to the total cross correlation, and describes how fast the cross correlation falls farther away from the peak, S0. The fall off is approximated by using the curvature of Q(S) at the peak; therefore, the W that maximizes $\Sigma_i Q(S(i))$ can be found using standard least squared mean techniques.

Once W is found, the error between the optimum shift vector, S0 and the shift predicted by the F(Xm, W) process can be found for each block. When the ratio of the shift error for a block to the RMS shift error for all the blocks exceeds a specified ratio, the block is an outlier. The outliers are rejected and the F(Xm, W) process is predetermined. This process is iterated until no more blocks are rejected.

To speed up the process, the range of displacements tested to find the peak in the NCC is decreased as alignment is processed from lowest to highest resolution. This can be done because the misalignment is reduced at each step. To speed up the process further, the size of the images can be greatly reduced in the X direction. These images can be used to search for the peak in the NCC in the Y direction. Then, the peak of the NCC in the X direction can be found in a similar manner. Finally, by the time the alignment is processed for the highest resolution image, it is known which blocks have the largest weight in determining the warping process; therefore, the peak in the NCC for the low weight blocks need not be found.

Figure 6:
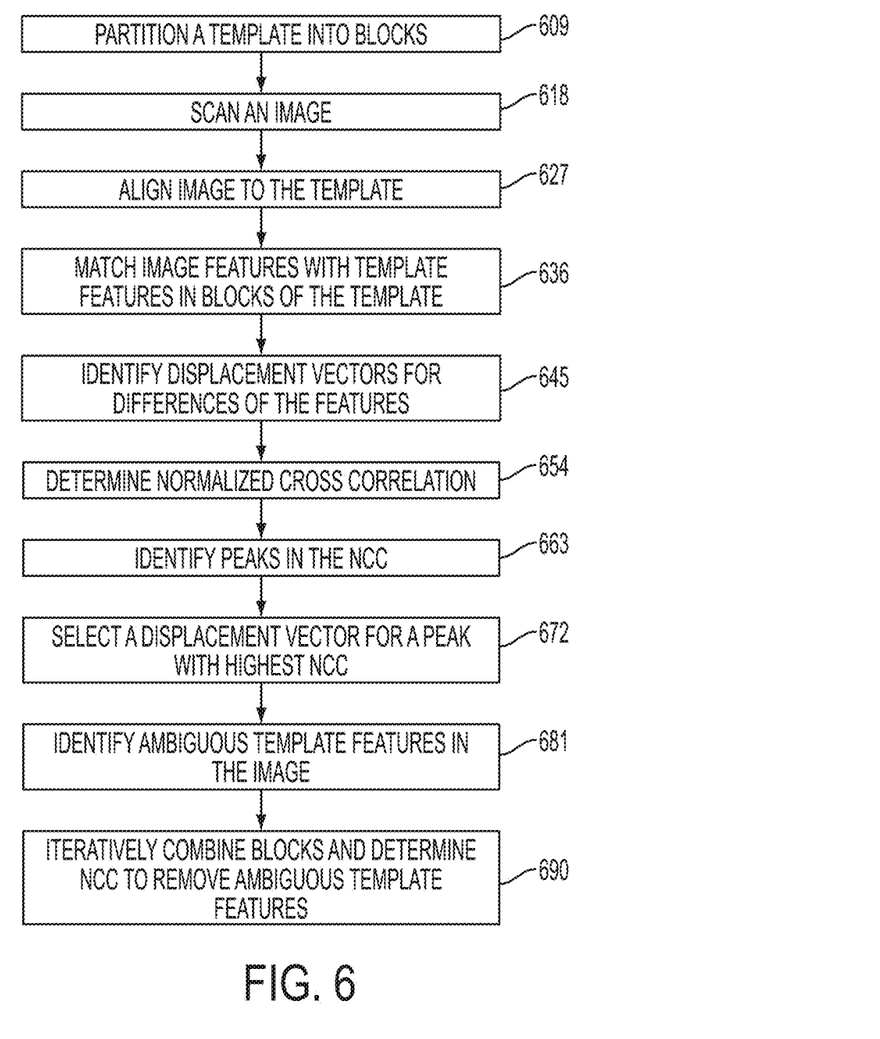
FIG. 6 is a flow diagram illustrating methods herein.

FIG. 6 is a flow diagram illustrating the processing flow of an exemplary method according to the present disclosure. The method is useful for reducing ambiguity in image alignment applications. At 609, a template is partitioned into blocks using an image processor. An image is scanned using an optical scanner, at 618. The image is aligned to the template, at 627. At 636, image features are matched with template features in the blocks of the template. Displacement vectors are identified for differences of the image features from the template features, at 645. Normalized cross correlation (NCC) is determined between blocks of the image and each block of the template using the image processor, at 654. Peaks in the NCC are identified, at 663. At 672, a displacement vector is selected for a peak with highest NCC for each the block of the template. Ambiguous template features are identified in the image, at 681, based on the displacement vector. At 690, blocks are iteratively combined and NCC determined to remove the ambiguous template features.

In other words, for each feature in the template, a list of displacement vectors is created to all candidate features in the image with a similarity metric above a predetermined threshold. For some template features the match will be ambiguous; that is, there may be many possible matches to features in the image. For some template features, the match will be unambiguous; that is, only one possible match. For an ambiguous template feature adjacent to an unambiguous feature, the displacement vectors in the ambiguous template are evaluated to determine if a reasonable warping function of one of the displacement vectors reveals a displacement vector in the vicinity of the displacement vector in the adjacent unambiguous template feature or features. If such a displacement vector is found, it is selected, and the ambiguous template feature becomes unambiguous. If there is no such displacement vector, the ambiguous template feature is ignored. An iterative region growing process is used to remove ambiguity from as many template features as possible.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the processes/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 6. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 6.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the processes/acts specified in the flowchart and/or block diagram block or blocks.

Figure 7:
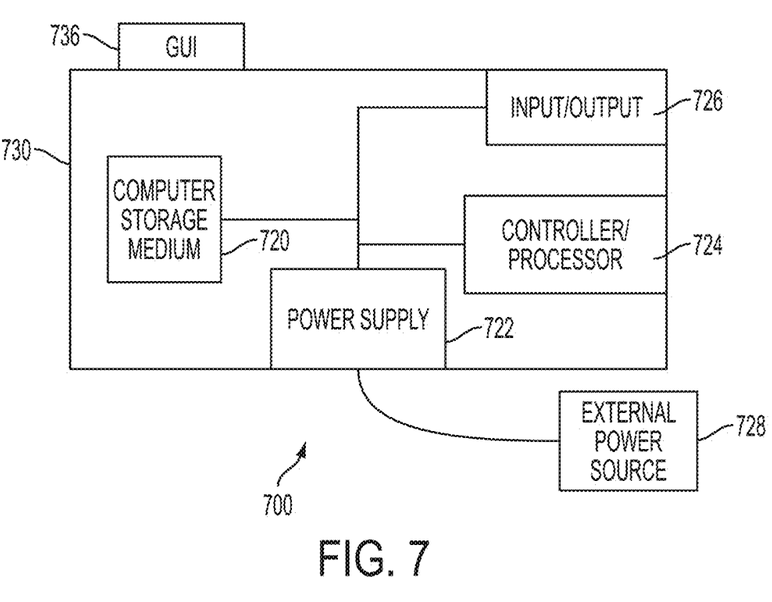
FIG. 7 is a schematic diagram illustrating devices herein.
Figure 8:
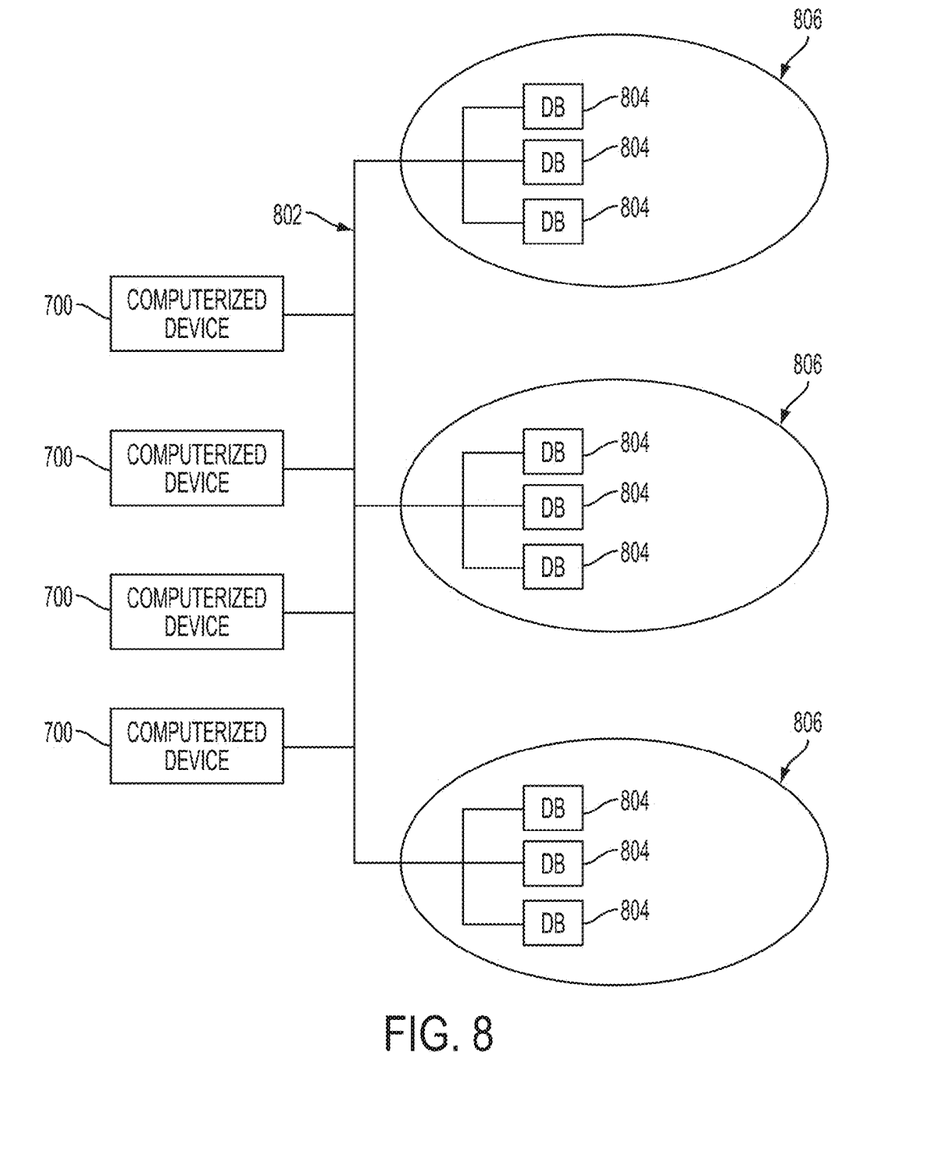
FIG. 8 is a schematic diagram illustrating systems herein.

FIG. 7 illustrates a computerized device 700, which can be used with systems and methods herein and can comprise, for example, a personal computer, a portable computing device, etc. The computerized device 700 includes a controller/processor 724 and a communications port (input/output device 726) operatively connected to the controller/processor 724. As described above, the controller/processor 724 may also be connected and to a computerized network 802 external to the computerized device 700, such as shown in FIG. 8. In addition, the computerized device 700 can include at least one accessory functional component, such as a graphic user interface (GUI) 736 that also operates on the power supplied from the external power source 728 (through the power supply 722).

The input/output device 726 is used for communications to and from the computerized device 700. The controller/processor 724 controls the various actions of the computerized device. A non-transitory computer storage medium 720 (which can be optical, magnetic, capacitor based, etc.) is readable by the controller/processor 724 and stores instructions that the controller/processor 724 executes to allow the computerized device 700 to perform its various processes, such as those described herein. Thus, as shown in FIG. 7, a body housing 730 has one or more functional components that operate on power supplied from the external power source 728, which may comprise an alternating current (AC) power source, to the power supply 722. The power supply 722 can comprise a power storage element (e.g., a battery) and connects to an external power source 728. The power supply 722 converts the external power into the type of power needed by the various components.

In case of implementing the systems and methods herein by software and/or firmware, a program constituting the software may be installed into a computer with dedicated hardware, from a storage medium or a network, and the computer is capable of performing various processes if with various programs installed therein.

In the case where the above-described series of processing is implemented with software, the program that constitutes the software may be installed from a network such as the Internet or a storage medium such as the removable medium.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium 720 may be a hard disk, or the like, which has the program stored therein and is distributed to the user together with the device that contains them.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical process(es). It should also be noted that, in some alternative implementations, the processes noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified processes or acts, or combinations of special purpose hardware and computer instructions.

As shown in FIG. 8, exemplary systems and methods herein may include various computerized devices 700 and databases 804 located at various different physical locations 806. The computerized devices 700 and databases 804 are in communication (operatively connected to one another) by way of a local or wide area (wired or wireless) computerized network 802.

Figure 9:
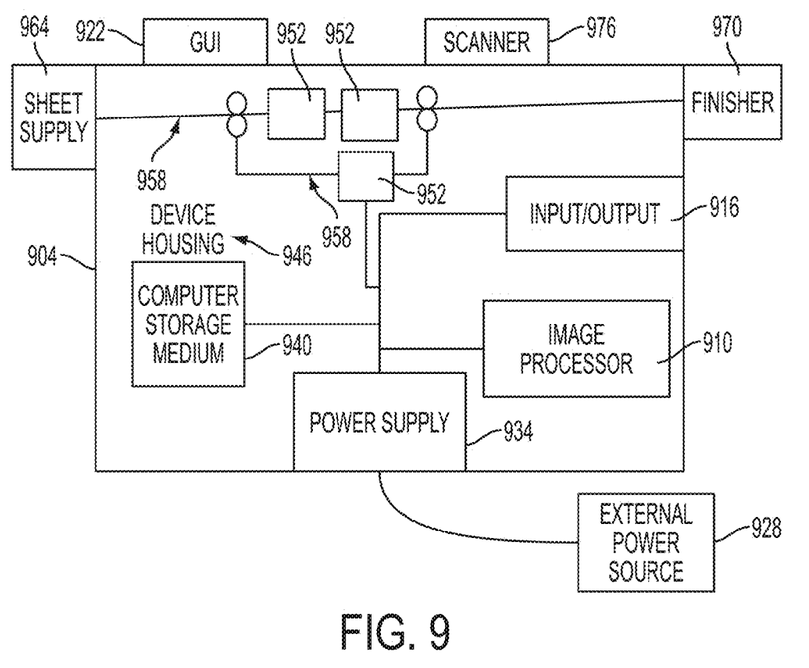
FIG. 9 is a schematic diagram illustrating devices herein.

FIG. 9 illustrates a computerized device comprising a multi-function device 904 that can be used with systems and methods herein and can comprise, for example, a printer, copier, multi-function machine, etc. The multi-function device 904 includes an image processor 910 and a communications port (Input/Output) 916 operatively connected to the image processor 910 and to a network external to the multi-function device 904, such as network 802 shown in FIG. 8. In addition, the multi-function device 904 can include at least one accessory functional component, such as a graphic user interface (GUI) assembly 922 that operates on the power supplied from the external power source 928, which may comprise an alternating current (AC) power source. The external power source 928 may provide electrical power through the power supply 934.

The image processor 910 controls the various actions of the multi-function device 904. A non-transitory computer storage medium device 940 (which can be optical, magnetic, capacitor based, etc.) is readable by the image processor 910 and stores instructions that the image processor 910 executes to allow the multi-function device 904 to perform its various functions, such as those described herein. Thus, as shown in FIG. 9, a device housing 946 has one or more functional components that operate on power supplied from the external power source 928 by the power supply 934. The power supply 934 can comprise a power storage element (e.g., a battery) and connects to the external power source 928. The power supply 934 converts the external power into the type of power needed by the various components.

The multi-function device 904 includes many of the components mentioned above and at least one marking device (printing engine(s)) 952 operatively connected to the image processor 910, which is a specialized image processor (that is different than a general purpose computer because it is specialized for processing image data), a media path 958 positioned to supply continuous media or sheets of media from a sheet supply 964 to the marking device(s) 952, etc. After receiving various markings from the marking device (printing engine(s)) 952, the sheets of media can optionally pass to a finisher 970, which can fold, staple, sort, etc., the various printed sheets. In addition, the multi-function device 904 includes at least one optical scanner 976 or other accessory functional component (such as a document handler, automatic document feeder (ADF), etc.) that also operates on the power supplied from the external power source 928 (through the power supply 934).

The one or more marking device (printing engine(s)) 952 are intended to illustrate any marking device that applies a marking material (toner, inks, etc.) to continuous media or sheets of media, whether currently known or developed in the future and can include, for example, devices that use a photoreceptor belt or an intermediate transfer belt or devices that print directly to print media (e.g., inkjet printers, ribbon-based contact printers, etc.).

As would be understood by those ordinarily skilled in the art, the multi-function device 904 shown in FIG. 9 is only one example and the systems and methods herein are equally applicable to other types of printing devices that may include fewer components or more components. For example, while a limited number of printing engines and paper paths are illustrated in FIG. 9, those ordinarily skilled in the art would understand that many more paper paths and additional printing engines could be included within any printing or document-processing device used with systems and methods herein.

Therefore, as shown above, the systems herein include an optical scanner 976 operatively connected to an image processor 910 receiving a template and partitioning the template into blocks. The optical scanner 976 scans an image to produce a scan. The image processor 910 aligns the scan to the template. The image processor 910 matches features of the scan with features of the template in the blocks of the template. The image processor 910 identifies displacement vectors for differences of the features of the scan from the features of the template. The image processor 910 determines normalized cross correlation (NCC) between blocks of the scan and each block of the template.

The image processor 910 identifies peaks in the NCC. The image processor 910 selects a displacement vector for a peak with highest NCC for each the block of the template. The image processor 910 identifies ambiguous template features in the scan based on the displacement vector. The image processor 910 iteratively combines blocks and determines NCC to remove the ambiguous template features.

Thus, an image input device is any device capable of obtaining pixel values from an image. The set of image input devices is intended to encompass a wide variety of devices such as, for example, digital document devices, computer systems, memory and storage devices, networked platforms such as servers and client devices which can obtain pixel values from a source device, and image capture devices. The set of image capture devices includes scanners, cameras, photography equipment, facsimile machines, photo reproduction equipment, digital printing presses, xerographic devices, and the like. A scanner is one image capture device that optically scans images, print media, and the like, and converts the scanned image into a digitized format. Common scanning devices include variations of the flatbed scanner, generally known in the arts, wherein specialized image receptors move beneath a platen and scan the media placed on the platen. Modern digital scanners typically incorporate a charge-coupled device (CCD) or a contact image sensor (CIS) as the image sensing receptor(s). The scanning device produces a signal of the scanned image data. Such a digital signal contains information about pixels such as color value, intensity, and their location within the scanned image.

Further, an image output device may be any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
   partitioning a template into blocks using an image processor, said template comprising a user-fillable pre-printed form;
   scanning an image using an optical scanner, said image comprising said pre-printed form having user markings;
   aligning said image to said template using said image processor;
   matching image features with template features in said blocks of said template using said image processor;
   identifying displacement vectors for differences of said image features from said template features using said image processor;
   determining normalized cross correlation (NCC) between blocks of said image and each block of said template using said image processor;
   identifying peaks in said NCC using said image processor;
   selecting a displacement vector for a peak with highest NCC for each said block of said template using said image processor;
   identifying ambiguous template features in said image based on said displacement vector using said image processor;
   removing said ambiguous template features from said image using said image processor; and
   iteratively combining blocks and determining NCC for each said block of said template using said image processor to remove said ambiguous template features from said image using said image processor.

2. The method according to claim 1, further comprising applying histogram equalization between said template and said image.

3. The method according to claim 1, further comprising creating an aligned image being the same size as said template using said image processor.

4. The method according to claim 3, further comprising:
   removing features of said template that are common with features of said aligned image using said image processor; and
   extracting remaining features in said aligned image using said image processor.

5. The method according to claim 4, said removing features of said template that are common with features of said aligned image further comprising removing only patterned lines from said image and leaving said user markings using said image processor, said remaining features comprising said user markings.

6. The method according to claim 1, said scanning said image using said optical scanner comprising obtaining a digital photograph of said image.

7. A method, comprising:
   receiving a template into an image processor, said image processor comprising a special purpose machine that is specialized for processing image data, said template comprising a user-fillable pre-printed form;
   providing electronic instructions to said image processor to cause said image processor to partition said template into blocks;
   receiving a scan of an image into said image processor, said image comprising said pre-printed form having user markings;
   providing electronic instructions to said image processor to cause said image processor to align said scan of said image to said template;
   providing electronic instructions to said image processor to cause said image processor to match image features with template features in said blocks of said template;
   providing electronic instructions to said image processor to cause said image processor to identify displacement vectors for differences of said image features from said template features;
   providing electronic instructions to said image processor to cause said image processor to determine normalized cross correlation (NCC) between blocks of said image and each block of said template;

providing electronic instructions to said image processor to cause said image processor to identify peaks in said NCC;

providing electronic instructions to said image processor to cause said image processor to select a displacement vector for a peak with highest NCC for each said block of said template;

providing electronic instructions to said image processor to cause said image processor to identify ambiguous template features in said image based on said displacement vector;

providing electronic instructions to said image processor to cause said image processor to remove said ambiguous template features from said image; and providing electronic instructions to said image processor to cause said image processor to iteratively combine blocks and determine NCC for each said block of said template to remove said ambiguous template features from said image.

8. The method according to claim 7, further comprising providing electronic instructions to said image processor to cause said image processor to apply histogram equalization between said template and said scan of said image.

9. The method according to claim 7, further comprising providing electronic instructions to said image processor to cause said image processor to create an aligned image, said aligned image being the same size as said template.

10. The method according to claim 9, further comprising:

providing electronic instructions to said image processor to cause said image processor to remove features of said template that are common with features of said aligned image; and providing electronic instructions to said image processor to cause said image processor to extract remaining features in said aligned image.

11. The method according to claim 10, providing electronic instructions to said image processor to cause said image processor to remove features of said template that are common with features of said aligned image removing only patterned lines from said scan of said image and leaving said user markings, said remaining features comprising said user markings.

12. The method according to claim 7, said receiving a scan of said image into said image processor comprising obtaining a digital photograph of said image.

13. A system, comprising:

an image processor receiving a template and partitioning said template into blocks, said template comprising a user-fillable pre-printed form; and an image capture device operatively connected to said image processor, said image capture device scanning an image to produce a scan, said image comprising said pre-printed form having user markings, said image processor aligning said scan to said template, said image processor matching features of said scan with features of said template in said blocks of said template, said image processor identifying displacement vectors for differences of said features of said scan from said features of said template, said image processor determining normalized cross correlation (NCC) between blocks of said scan and each block of said template, said image processor identifying peaks in said NCC, said image processor selecting a displacement vector for a peak with highest NCC for each said block of said template, said image processor identifying ambiguous template features in said scan based on said displacement vector, said image processor removing said ambiguous template features from said scan; and said image processor iteratively combining blocks and determining NCC for each said block of said template to remove said ambiguous template features from said scan.

14. The system according to claim 13, said image processor applying histogram equalization between said template and said scan.

15. The system according to claim 13, further comprising a printing device operatively connected to said image processor, said printing device printing a form-based print job having user-fillable areas comprising patterned lines to print said user-fillable pre-printed form.

16. The system according to claim 13, said image capture device comprising one of scanners, cameras, photography equipment, facsimile machines, photo reproduction equipment, digital printing presses, and xerographic devices.

17. The system according to claim 13, further comprising:

said image processor creating an aligned image from said scan, said aligned image being the same size as said template said image processor removing features of said template that are common with features of said aligned image; and said image processor extracting remaining features in said aligned image.

18. The system according to claim 17, said image processor removing only patterned lines from said aligned image and leaving said user markings, said remaining features comprising said user markings.

* * * * *